ARTHUR R. KANTROWITZ
THOMAS R. BROGAN
DANIEL HRITZAY
INVENTORS

ATTORNEYS

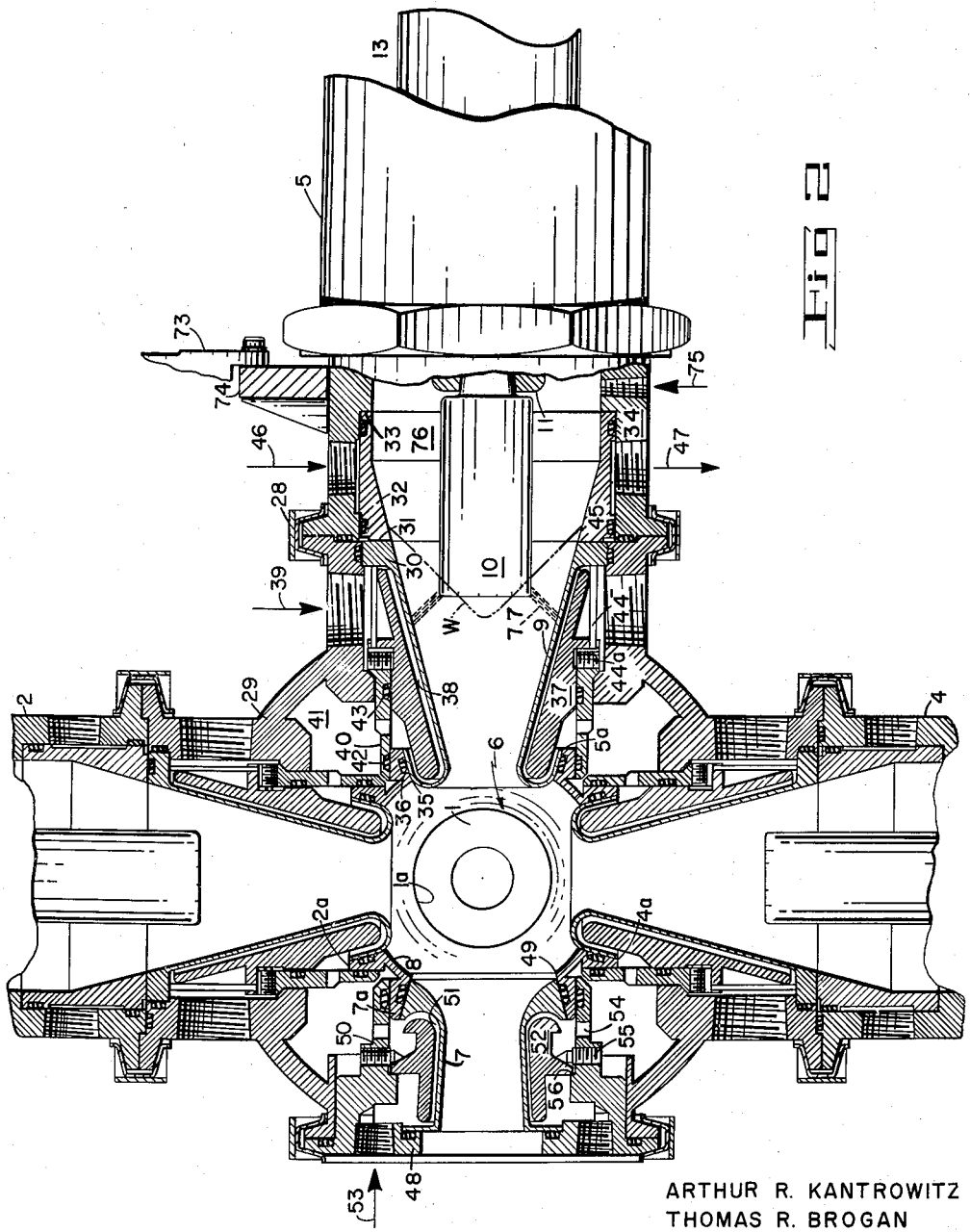

Feb. 21, 1961   A. R. KANTROWITZ ET AL   2,972,696
PLASMA GENERATOR
Filed Aug. 24, 1959   4 Sheets-Sheet 3

ARTHUR R. KANTROWITZ
THOMAS R. BROGAN
DANIEL HRITZAY
INVENTORS

BY
ATTORNEYS

ARTHUR R. KANTROWITZ
THOMAS R. BROGAN
DANIEL HRITZAY
INVENTORS

BY Alden D. Redfield
Warren Kuntz
ATTORNEYS

United States Patent Office 2,972,696
Patented Feb. 21, 1961

2,972,696

PLASMA GENERATOR

Arthur R. Kantrowitz, Arlington, and Thomas R. Brogan and Daniel Hritzay, Winchester, Mass., assignors to Avco Corporation, Cincinnati, Ohio, a corporation of Delaware Filed Aug. 24, 1959, Ser. No. 835,554

10 Claims. (Cl. 313—231)

The present invention relates to a plasma generator and more particularly to a generator capable of producing high temperature air for simulating the aerodynamic and thermodynamic environment encountered by a re-entry vehicle during the terminal portion of its flight regime.

Spurred by the needs of the missile field, the study of high temperature phenomena has made impressive advances during recent years. To fill the need for basic information about high temperature gas dynamics, the shock tube has been widely and very successfully used. The shock tube is a simple, but extremely versatile, laboratory instrument that can be operated over a wide range of conditions to determine important fundamental information about heat transfer, radiation, and the electrical properties of gases. By its nature, however, the shock tube is limited to tests of millisecond duration. Other devices have been employed with varying degrees of success, including shock tunnels, ballistic ranges, and "hot shot" tunnels for tests of longer duration. Pebble bed heaters have also been used in high speed flight research but unfortunately cannot produce gas at enthalpies appropriate to nose cone and satellite re-entry studies. Although the hot shot tunnel is capable of extending shock tube tests by an order of magnitude, fraction of a second test times are not sufficient to produce steady state conditions in structures, radiative equilibrium and many other phenomena. Further, while prior art devices have added to knowledge of hypersonic flight, the limited duration of tests makes them unsuitable for exploring the interaction of aerodynamics and materials in a high temperature environment. Such characteristics must be determined by relatively long tests, particularly so if the material under study is being investigated for its ablation characteristics.

The novel plasma generator set forth in this specification makes possible tests of required duration and therefore is well adapted for materials testing. In addition, by the use of an expansion nozzle and vacuum system, a hypersonic wind tunnel can be supplied by this generator in which radiative equilibrium of structures can be attained, and aerodynamic forces and moments acting on models of re-entry vehicles can also be determined by use of this novel device.

Briefly, the present invention comprises a plurality of arc type generating units connected to a common plenum chamber. In the plenum chamber the hot plasma of the individual generators is thoroughly mixed prior to emerging from a nozzle as a homogeneous stream of extremely high temperature plasma. Through an ingenous arrangement of components, steady state operation of the plurality of generators can be attained, and the desired plasma can be produced free of both time and space variations. That is to say, by means of the present invention, a plurality of generators may be efficiently operated simultaneously without pulsation (time variation) or stratification (space variation) of the effluent stream of high temperature plasma.

Scientists today usually credit H. Maecker with being one of the first to generate successfully high temperatures in water stabilized arcs (see Friekelnburg, W., and Maecker, H., "Handbuch der Physik," XXII, Springer, Berlin, 1956). Stimulated by the extreme demands of modern technology, scientists in recent years have been turning with increasing interest to the use of plasma generators as a laboratory tool. Such devices have been successfully constructed for testing materials, and more particularly still, for investigating models of bodies in high temperature environments. Work in this field has not been without difficulty, however, and much work has been done in converting the embryonic plasma generator of former years into a reliable piece of test equipment. As is so often the case, an evolutionary growth has occurred from small, relatively easily managed, plasma generators to those of larger size.

To preserve structural integrity and prevent contamination of the plasma, much of a plasma generator is made of cooled metal. It has been found that, as generators increase in size, the water cooled arc chamber must be increased to make satisfactory dissipation of heat possible. An inherent size limit is reached as radiation losses from the hot gases of the arc chamber and cathode currents become prohibitively large.

In trying to achieve the required plasma temperatures by use of a single generator, scientists soon found that the effluent plasma tended to pulsate with attendant severe temperature variations. Further, the energy content across any section of the stream would vary.

It was not until a plenum chamber was added to a plasma generator that stable operating conditions were attained. Again, as continuing efforts were made to enlarge the capacity of plasma generators, it was found necessary to use the plenum chamber, not only for its original purposes, but as a means of combining and mixing the output from a plurality of generating units operated simultaneously.

In view of the foregoing it will be understood that it is a broad object of the present invention to provide a novel and improved form of plasma generator.

Another object of the invention is to provide a plasma generator in which the plasma from a plurality of separate arcs may be combined in a common effluent stream.

Another object of the invention is to provide a plasma generator including a plenum chamber, particularly a plenum chamber to which is introduced the plasma from a plurality of arcs.

More specifically, it is an object of the invention to provide in a plasma generator a plenum chamber for damping surges and mixing and producing a uniform high temperature plasma. It is also an object to condense impurities from the plasma.

A more specific object of the invention is the provision of a plenum chamber between the anode nozzle and the discharge nozzle of a plasma generator. Still more specifically, it is an object to provide a plenum chamber in communication with a plurality of anode nozzles of generating units employing a plurality of separate electric arcs.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 2 is an enlarged cross sectional view of the plenum chamber and four of its associated generating units taken on plane 2—2 of Figure 1;

Figure 3 is a cross sectional view through a generating unit showing the structure for adjustably positioning its rod type electrode.

The heart of any plasma generator is a pair of electrodes between which an electric arc is maintained in the presence of a fluid stream. The steam helps to stabilize the electrical discharge, i.e., confine it to a desirable region of the electrodes and to prevent prolonged concentration at any one point with resulting damage to electrodes. The fluid may be air, hydrogen, inert gases or, as in early versions of the plasma generator, may be water vapor. Regardless of what fluid is used, a neutral plasma results comprising positive ions, electrons, and other molecular fragments which are heated to high temperature by the arc and ejected from the plasma generator as a high temperature stream.

In the preferred embodiment of the present invention, five pairs of electrodes are arranged in what has been termed "generating units," the plasma from the five individual generating units feeding into a common plenum chamber where thorough mixing occurs prior to emergence of the plasma in a single high velocity, high temperature stream.

Figure 1:
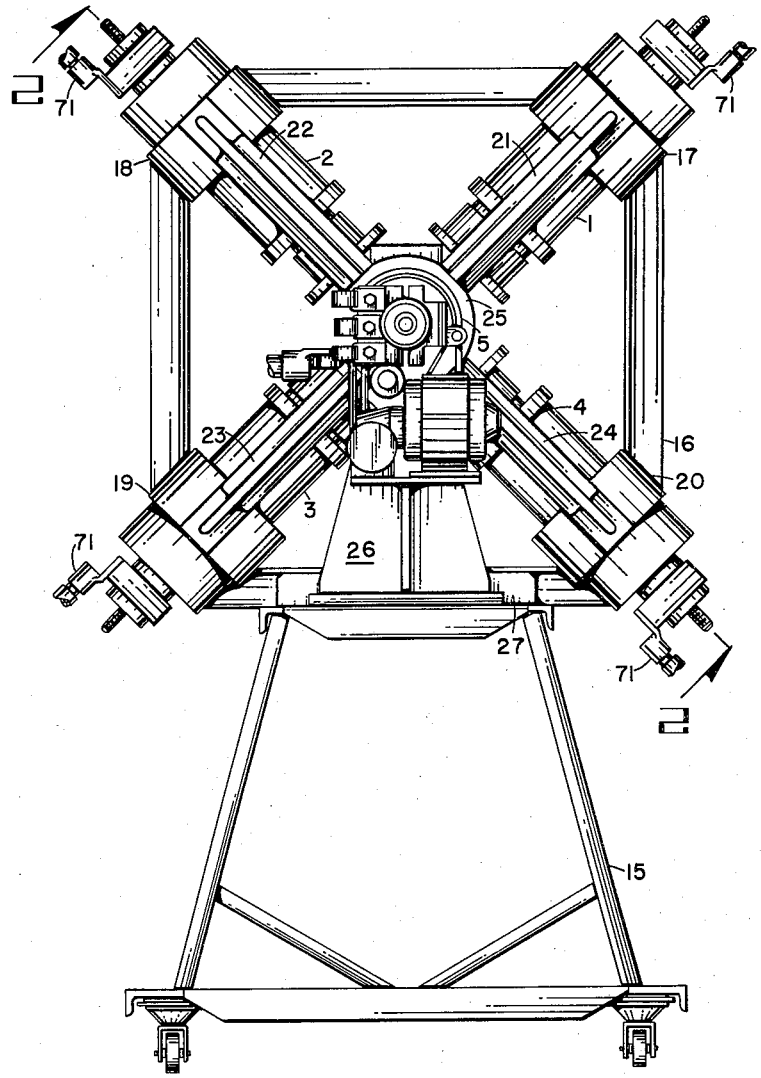
Figure 1 is a rear elevational view of a novel plasma generator incorporating a plurality of generating units.
Figure 5:
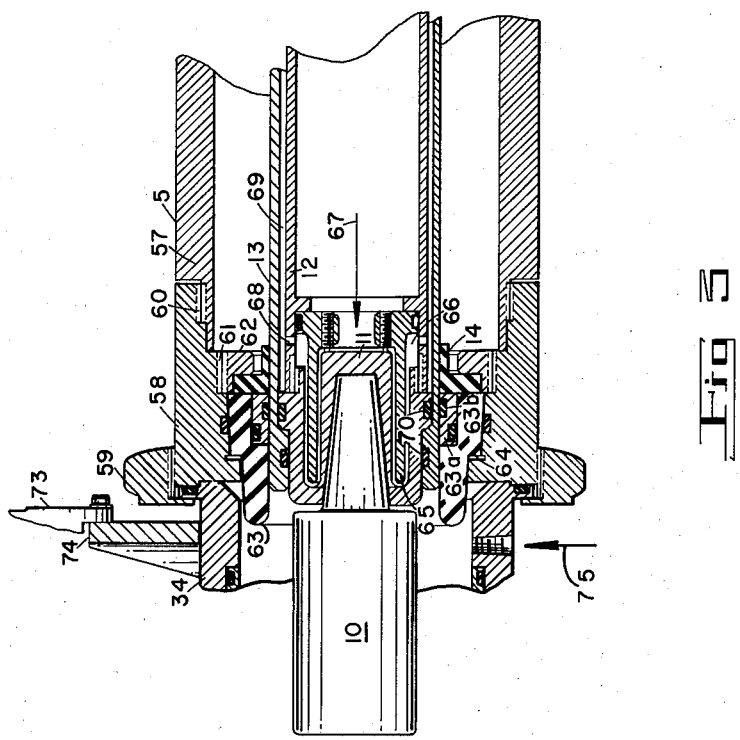

Turning attention first to Figure 1, generating units 1–5 are shown as they appear when viewed from the rear of the plasma generator. It will be noted that generating units 1–4 are arranged in a cruciform configuration radiating from a central point. The fifth generating unit 5 extends rearwardly from the central point.

Turning attention to Figure 2, the inner ends of generating units 2, 4 and 5 are shown in engagement with the plenum chamber, generally designated 6. Generating unit 1 can be seen extending into the plane of the paper, generating unit 3 being omitted because it is above the plane of the paper. Thus four of the generating units are arranged much like the spokes of a wheel, with the fifth generating unit extending outwardly as does the hub of the wheel. The exit nozzle 7 also communicates with the plenum chamber 6 and is positioned directly opposite the generating unit 5.

As illustrated by Figures 2 and 3, the plenum chamber comprises a spherical wall 8 integrally joined to a plurality of collars 1a–5a and to a sixth collar 7a. As will be explained in greater detail, these collars are abutted by the generating units and exit nozzle, the associated units and nozzle defining, with the plenum chamber, a generally spherical volume in which plasma from each of the generating units is thoroughly mixed. To convoy the details of the plenum chamber, it has been shown in assembled relationship with generating unit 5 in Figure 4.

Since the generating units are identical, it will suffice to explain the details of the construction with reference to unit 5. As illustrated by Figures 2 and 3, the unit includes an anode 9 in the form of a converging nozzle, the restricted end of which communicates directly with the plenum chamber. The other electrode comprises a carbon rod 10. The rod is tapered at one end and is force-fitted into an electrode holder 11. The electrode holder in turn is threadedly engaged with an electrode tube 12 which is concentrically positioned within an electrode support 13. The support 13 is slidably positioned by electrical insulating ring 14 permitting movement of the support and electrode axially towards and away from the anode nozzle 9. The supporting elements for the electrode 10 will be described more fully later in the specification.

Returning to Figure 1, it will be noted that a frame 15 is provided for supporting a rectangular vertical framework 16. The corners of the framework are rigidly secured to cylindrical guides 17–20 which slidably support the generating units 1–4, respectively. Extending rearwardly from each of the cylindrical guides are struts 21–24 which are secured to a common cylindrical guide 25. This cylindrical guide slidably positions the generating unit 5. A vertical support plate 26 extends between the guide 25 and platform 27 which constitutes the top portion of the frame 15. Associated with each guide and generating unit is a jack screw, such as shown at 25a in Figure 4, for maintaining any adjusted position of the generating units.

Thus, in partial summary, the cylindrical guides and associated frame members support the generating units which radiate outwardly from plenum chamber.

As illustrated by Figure 2, each of the radiating units is clamped, as at 28, to a spherical housing 29 which surrounds the plenum chamber. The housing is actually supported through its attachments to the generating units which are in turn slidably supported by the cylindrical guides.

Considering now the structural details of the generating units, it will be noted that the anode nozzle 9 includes an integral flange 30 which butts against face 31 of the ring 32. The ring also butts at 33 against intermediate housing 34 of the generating unit. When the generating unit is clamped to the spherical housing 29, ring 32 holds nozzle 9 in intimate wedged engagement with the plenum chamber at 35. An O ring seal is provided at 36 to assure a fluid tight connection.

Within the nozzle is a core 37 which is slightly larger than the nozzle and defines a coolant channel 38 through which water, introduced at 39, may flow to cool the nozzle structure. The water is restricted in its flow by a cylindrical baffle 40 which separates the flow channel 38 from sump 41, defined by the spherical housing and plenum chamber. The sump may drain through conventional means (not shown). It will be noted that seal rings are provided at 42 and 43 to prevent coolant from bypassing the baffle 40.

At intervals around the core 37 are provided longitudinally extending wires 44 which serve to locate the core 37 and baffle 40 relative to the anode nozzle. Set screw 44a prevents movement of the baffle relative to the core.

It will also be noted that ring 32 cooperates with intermediate housing 34 in defining a cylindrical space 45 through which coolant, introduced at 46 and vented at 47, may flow to cool the ring and intermediate housing.

Thus, in retrospect, the ring 32 serves as an extension of the nozzle. Both the ring and the nozzle are water-cooled.

At this point it will be well to note that the plenum chamber is supported by the inwardly projecting ends of a plurality of nozzles associated with the generating units. Since the plenum chamber is not under fixed restraint, it can adjust to differential thermal expansions that may be experienced, and distortion and overstressing of parts is avoided. Spherical housing 29 is supported by the intermediate housings of the generating units.

The construction and support of the exit nozzle is generally similar to that of the anode nozzles. The exit nozzle 7 is clamped by adapter 48 in wedged engagement at 49 with the plenum chamber. The adapter includes an extension 50 which is slidably engaged with the exterior of collar 7a making a seal for coolant channel 51 defined by core 52 and the nozzle 7. Coolant is introduced at 53 and flows through channel 51 and holes 54 to the sump 41. As illustrated by Figure 2, the core may be held by set screw 55 in position against shoulder 56.

It will be noted at this time that the contour of the exit nozzle 7 differs somewhat from that of the anode nozzles. Although either construction may be used, that of nozzle 7 is preferred since less nozzle area is exposed to the high temperature plasma within the plenium chamber and heat losses are reduced. Further, a nozzle, such as 7, can be made with a larger throat area than nozzles, such as 9, within the given dimensions of the generator.

Directing attention to Figure 3, it will be noted that the intermediate housing 34 of the generating unit is aligned with barrel 57 and barrel extension 58. Nut 59 holds the intermediate housing 34 in secure engagement with the barrel extension 58 which in turn is threadedly engaged with barrel 57, as indicated at 60. The barrel extension is internally threaded at 61 to receive nut 62. The nut clamps ring 14 against cylindrical insulator 63 and holds it in position against shoulder 64 of the barrel extension. Thus the barrel extension, with the ring 14 and insulator 63, may be removed as a sub-assembly permitting access to the interior of the barrel 57. Ring 63a, with seals 63b, render the assembly fluid tight.

Concentrically positioned about the electrode holder 11 is a core 65 which defines with the holder a flow channel 66 through which coolant may be circulated to cool the electrode holder and surrounding components. Coolant may be introduced at 67 and vented at 68 to cylindrical channel 69 defined by tubular members 12 and 13. Seal rings 70 prevent loss of coolant from the system.

Figure 4:
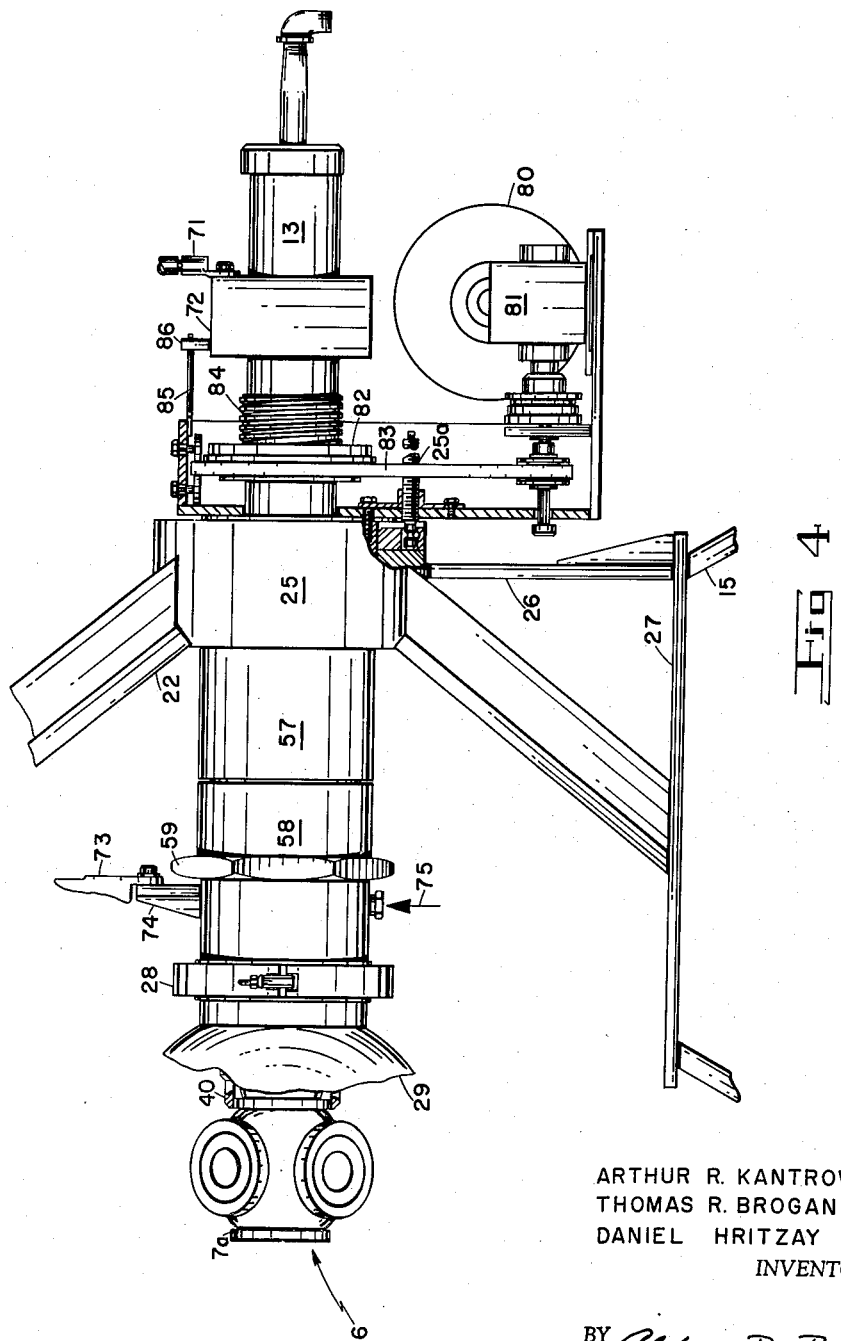
Figure 4 is a side view of a generating unit in its assembled position relative to the plenum chamber.

The electrode support 13 extends completely through the generating unit and extends out the far end as indicated in Figure 4, for a purpose to be explained.

In use, a D.C. electrical potential is applied across the cathode and anode nozzle of each generating unit and in this way, an electrical discharge is established. Current may be supplied to cathode 10 through electrode support 13. Supply mains 71 are connected to terminal block 72 which is attached to the extended end of support 13 (see Figures 1 and 4). An electrical path is established to the nozzle 9 through the intermediate housing 34 and ring 32. Another electrical main 73 is attached to terminal 74 which projects laterally from the intermediate housing (see Figure 2).

In order to initiate electrical discharge, a small tungsten wire is first attached to each carbon cathode, as indicated in phantom lines at W in association with electrode 10. When a switch on the power supply is closed connecting the D.C. potential across the arc electrodes, a large current flows, vaporizing the wires and ionizing the gas between the electrodes sufficiently to support a continuous electrical discharge within all of the generating units.

To stabilize the arc and supply the gaseous medium for forming the plasma, air, or any other suitable gas, may be introduced into each generating unit, as at 75 (see Figure 2). Desirably, although not necessarily, the gas is introduced tangentially at two diametrically opposed points. As the air under pressure enters space 76, it forms a swirling column between the electrodes, stabilizing the arc discharge, indicated at 77. In passing through the arc, the air is broken down into plasma and is intensely heated. The plasma from each generating unit flows into the plenum chamber where it mixes thoroughly before emerging from nozzle 7 as a homogeneous stream of high temperature plasma. The plenum chamber serves to damp any surges from the individual generating units and thoroughly mixes the plasma so that the stream flowing from the exit nozzle is uniform in composition as well as temperature and is free of pulsations.

The exterior portions of the generator, such as barrel 57, barrel extension 58 and spherical housing 29, may be made from stainless steel. The plenum chamber itself, and anode nozzles, preferably are made from copper of high electrical conductivity. Insulating ring 14 and insulator 63, which electrically isolate the electrode support 13 from the barrel of the generating unit, may be made from Teflon or any other high temperature insulation. The cathode rods preferably are made from carbon, such as National Carbon Type AGR graphite.

During operation of the generator, the graphite rods are gradually consumed. To compensate for such consumption of the rods, they are advanced slowly towards the center of the plenum chamber. This may be done by electric motors, such as motor 80, shown in connection with generating unit 5 (see Figure 4). The motor 80 drives a reduction unit 81 which in turn drives a pulley 82 through belt 83. The pulley is internally threaded and engages thread 84 formed on the electrode support 13. A guide rod 85 is slidably engaged with yoke 86, attached to the terminal 72, and prevents rotation of the electrode support 13 during the time that motor 80 is in operation. This assures a uniform axial movement of the electrode support and its associated components.

Motor 80 is preferably of the D.C. type and can be varied in speed to effect any desired rate of feed of the associated rods.

Because of the consumption of the carbon electrodes, a small amount of carbon is imparted as an impurity to the plasma. Because of the low operating temperature of the plenum chamber due to water cooling, a certain amount of these impurities deposit on the walls of the plenum chamber, reducing the contamination of the plasma leaving the generator. This is an advantage of the plenum chamber.

By way of illustration, but not limitation, typical operating parameters will be mentioned. A generator, constructed as illustrated, may be operated at pressures up to 40 atmospheres. Voltage and current strongly depend on the operating pressure. With D.C. voltages of up to 400 volts applied across the electrodes, a current flow of up to 6000 amps. results, releasing as much as 2.0 megawatts of power in each generator unit. Thus, up to 10 megawatts of power can be applied to the generator. By prior art standards, this is an enormous amount of energy to release in a device of this type. Plasma enthalpy may attain a value of 10,000 B.t.u./lb. and a temperature of 15,000° F.

Air may be injected, as at 75, at any required pressure. It has been found desirable, however, to introduce the air at high velocity to promote swirl, as has been explained. Pressures of 1000 p.s.i. have been found entirely satisfactory.

The plasma from nozzle 7, at temperatures up to 7000° K. if air is injected at 75 and even higher temperatures if gases, such as inert gases, are used, may emerge at velocities greater than sonic. Depending upon the design of the exit nozzle, velocities can be increased through expansion of the plasma.

The power source for operating the generator may be a bank of series-parallel connected batteries. The relatively low initial cost and ready availability of a battery bank recommends it for experimental purposes. The power to the generator is controlled and stabilized by the use of a ballast resistor.

In use, materials under investigation may be positioned in the stream of plasma in test sections (not shown) attached to the generator. Because of the extremely high temperatures and the relatively long duration that the flow of plasma can be maintained, materials may be realistically tested in an environment simulating conditions encountered by re-entry vehicles, such as nose cones of intercontinental ballistic missiles. It has been found from actual experience that a generator of the type described is extremely useful as a laboratory tool for investigating not only materials but particular shapes for use in re-entry vehicles. In investigations of the latter type, small models of the vehicles may be positioned directly in the plasma stream after the stream has been expanded in a nozzle. The characteristics of any particular shape may be readily determined by noting the nature of high temperature deterioration experienced during testing, as well as attendant aerodynamic effects.

The various features and advantages of the invention are thought to be clear from the foregoing description. Others not specifically enumerated will undoubtedly occur to those versed in the art, as will many variations and

We claim:

1. In combination in a plasma generator, a generally spherical plenum chamber, a plurality of co-planar generating units radiating outwardly from and communicating with said plenum chamber, another generating unit radiating outwardly from said plenum chamber normal to the plane of said first-named generating units, said last-mentioned generating units also communicating with said plenum chamber, each of said generating units including means for producing high temperature plasma and supplying it to said plenum chamber where it is mixed, and an exit nozzle through which said plasma may flow from said plenum chamber, said exit nozzle being located opposite said last-mentioned generating unit.

2. In a plasma generator, a generally spherical plenum chamber, a spherical housing surrounding said plenum chamber, said plenum chamber and housing having pairs of correspondingly positioned openings, a plurality of generating units, each generating unit being engaged with a pair of the openings in said plenum chamber and housing, each generating unit including electrodes for maintaining a continuous electrical discharge, means for supplying gas to the region of the electrical discharge within each generating unit whereby high temperature plasma may be formed and fed to said plenum chamber, another pair of correspondingly positioned openings in said plenum chamber and housing, and an exit nozzle in engagement with the last-mentioned pair of openings.

3. In a plasma generator, a plurality of generating units, a framework supporting said generating units in position radiating outwardly from a common point, a plenum chamber supported by the ends of said generating units adjacent the common point, means in each generating unit for producing high temperature plasma, said means communicating with said plenum chamber, and a discharge nozzle connected to said plenum chamber through which plasma may emerge after passing through said plenum chamber.

4. Apparatus as defined in claim 3 in which said plenum chamber comprises a spherical wall with integrally formed collars for slidably engaging the inner ends of said generating units.

5. In combination in a plasma generator, a plurality of generating units, each generating unit comprising a pair of electrodes for maintaining a continuous electrical discharge and means for supplying gas to the region of the discharge whereby it may be reduced to plasma, a plenum chamber, said plenum chamber communicating with said generating units for receiving plasma formed therein, and exit means from said plenum chamber through which plasma may be discharged.

6. In a plasma generator, a generating unit comprising an anode nozzle and a cathode, means for applying an electrical potential across said anode nozzle and cathode whereby a continuous electrical discharge may be established, means for introducing gas under pressure to the region of the discharge whereby the gas may be broken down into high temperature plasma, and means for mixing the plasma, said anode nozzle discharging into said mixing means.

7. In combination, a plurality of separate sources of high temperature plasma, a plenum chamber in communication with said sources, and means for discharging plasma from said plenum chamber after mixing.

8. In combination in a plasma generator, a source of high temperature plasma, a plenum chamber in communication with said source, and an exit nozzle in communication with said plenum chamber whereby plasma from said source may be mixed by said plenum chamber prior to issuance from said exit nozzle.

9. In combination in a plasma generator, a mixing chamber, means for supplying high temperature plasma to said mixing chamber, and means for discharging plasma from said mixing chamber in a homogeneous stream.

10. A generating unit comprising an anode nozzle, a cathode rod concentrically positioned within said nozzle, means for electrically insulating said rod from said nozzle, means for applying an electrical potential across said rod and nozzle, whereby a continuous electrical discharge may be established therebetween, means for introducing gas to the region of electrical discharge, and means for advancing said rod towards said nozzle as it is consumed by the electrical discharge.

No references cited.